(12) United States Patent
Inada

(10) Patent No.: US 7,689,082 B2
(45) Date of Patent: Mar. 30, 2010

(54) OPTICAL FIBER TRANSMISSION LINE FOR WAVELENGTH DIVISION MULTIPLEXING SIGNALS

(75) Inventor: Yoshihisa Inada, Tokyo (JP)

(73) Assignee: NEC Corporation, Tokyo (JP)

(*) Notice: Subject to any disclaimer, the term of this patent is extended or adjusted under 35 U.S.C. 154(b) by 1343 days.

(21) Appl. No.: 10/397,515

(22) Filed: Mar. 27, 2003

(65) Prior Publication Data
US 2003/0185574 A1    Oct. 2, 2003

(30) Foreign Application Priority Data
Mar. 27, 2002  (JP) .............. 2002-088759

(51) Int. Cl.
*G02B 6/02* (2006.01)
*H04B 10/00* (2006.01)
(52) U.S. Cl. .............. 385/123; 385/126; 398/148
(58) Field of Classification Search .............. 385/15, 385/16, 24, 123–128; 359/109, 161; 398/147, 398/148
See application file for complete search history.

(56) References Cited

U.S. PATENT DOCUMENTS

| 5,602,666 | A | * | 2/1997 | Ishikawa et al. | ............ 398/159 |
| 6,307,985 | B1 | * | 10/2001 | Murakami et al. | ............ 385/24 |
| 6,377,740 | B1 | * | 4/2002 | Onishi et al. | ............ 385/123 |
| 2004/0151510 | A1 | * | 8/2004 | Tanaka et al. | ............ 398/147 |

FOREIGN PATENT DOCUMENTS

| JP | 9-23187 | | 1/1997 | |
| JP | 9-191290 | | 7/1997 | |
| JP | 11-331074 | | 11/1999 | |
| JP | 261377 | * | 9/2000 | ............ 385/24 |
| JP | 2001-91761 | | 4/2001 | |
| JP | 2001-94510 | | 4/2001 | |
| JP | 2001-174650 | | 6/2001 | |
| JP | 274615 | * | 9/2004 | ............ 398/147 |

* cited by examiner

*Primary Examiner*—Kevin S Wood
(74) *Attorney, Agent, or Firm*—Dickstein Shapiro LLP

(57) ABSTRACT

A wavelength division multiplexing optical fiber transmission line that reduces signal deterioration caused by dispersion even in a transmission system having a high-speed transmission rate, and is suited to a long-distance transmission. A dispersion management transmission line is connected between optical repeaters. The dispersion management transmission line has 3 to 6 pairs of fiber sections, of which each has a positive dispersion fiber and a negative dispersion fiber, connected in series. Dispersion compensation is made step by step over four (4) times for dispersion and a dispersive slope, which were accumulated by the front-stage positive dispersion fiber, by the next-stage negative dispersion fiber.

9 Claims, 6 Drawing Sheets

OPTICAL FIBER TRANSMISSION LINE FOR WAVELENGTH DIVISION MULTIPLEXING SIGNALS

BACKGROUND OF THE INVENTION

The present invention relates to a wavelength division multiplexing optical fiber transmission line that reduces signal deterioration due to dispersion, and allows long-distance transmission to be made even at a high-speed transmission rate.

As a rule, in an optical fiber transmission system with a wavelength division multiplexing that is referred to as a WDM, excellent and yet uniform transmission quality is required for all channels in which a wavelength is divided and transmitted. On the other hand, as an optical fiber configuring a signal transmission line has wavelength dependency (dispersive slope) normally of differing in a dispersive amount responding to the wavelength, it is well-known that different transmitting characteristics are shown channel by channel to be used (for each wavelength to be used).

From such a background, so as to realize uniform transmission quality for all channels in the optical fiber transmission system with the wavelength division multiplexing, dispersive flatness of the transmission optical fiber (that dispersion is less dependent on the wavelength) is required. So as to realize this dispersive flatness, it is known that a dispersion management transmission line 19 shown in FIG. 9 (A) is effective. This dispersion management transmission line 19 has a positive dispersion fiber 21, of which a wavelength dispersion value is positive, and a negative dispersion fiber 22 for compensating for accumulated dispersion and the dispersive slope, which are accumulated in this positive dispersion fiber 21, arranged in turn. Furthermore, an optical repeater 18 is arranged in a front stage of the dispersion management transmission line 19, and an optical repeater 20 is arranged in a rear stage of the dispersion management transmission line 19.

Employment of such a configuration allows a dispersion characteristic to be flattened to some degree. In the event that the accumulated dispersion caused by the positive dispersion fiber 21 is large, however, a phenomenon occurs that a nonlinear component is generated due to an interaction between this accumulated dispersion and the negative dispersion fiber 22, thus giving rise to ultimate transmission deterioration.

This phenomenon will be specifically explained by referring to FIG. 9 (B).

In FIG. 9 (B) are illustrated as a map accumulated dispersion amounts in the longitudinal direction of a span of the optical repeater 18, the dispersion management transmission line 19, and the optical repeater 20. Furthermore, conceptual time waveforms at typical several points on the map are also illustrated.

F point shown in a graph of the accumulated dispersion of FIG. 9 (B) corresponds to an output region of the optical repeater 18 (an input region of the positive dispersion fiber 21). Also, G point corresponds to a connection region between the positive dispersion fiber 21 and the negative dispersion fiber 22. Furthermore, H point corresponds to an output region of the negative dispersion fiber 22 (input region of the optical repeater 20).

In a characteristic f at point F, output signal waveforms at times t1 and t2, which correspond to wavelength multiplexing channels (for example, two channels), are shown in a time axis t. This characteristic f assumes a normal and beautiful waveform because of a state that the signal, which was just amplified and compensated by the optical repeater 18, was input into the positive dispersion fiber 21.

On the other hand, a characteristic g at G point is in an attenuated state due to the fact that the output of the optical repeater 18 passes through the positive dispersion fiber 21, and yet is set into a state that a leading edge of the waveform was gently spread due to a component of the accumulated dispersion to be generated by passing through the positive dispersion fiber 21. It is in a state that the waveforms are in a heavily overlapped between two bits, thus causing a large nonlinear effect (self-phase modulation) to occur.

Such a signal at G point becomes a characteristic h that is in a state that compensation was made for the accumulated dispersion and the dispersive slope by passing through the next-stage negative dispersion fiber 22. Waveforms at this H point became distorted because its original waveform having the ideal state (characteristic h) was not correctly reproduced, and thus, transmission quality became deteriorated. Such deterioration of transmission quality is due to generation of a component that is beyond of the capability of the compensation in the event of targeting a large accumulated dispersion amount because the compensation is made only one time in one dispersion management transmission line 19.

For this reason, for example, a technology described below was disclosed in JP-P2001-91761A. One dispersion management transmission line has a positive dispersion fiber section, of which the wavelength dispersion is positive, and a negative dispersion fiber section, of which the wavelength dispersion is negative, arranged alternatively in plural. And not by making component compensation only one time, but making it step by step for transmission deterioration caused by an interaction between the nonlinear effect (self-phase modulation), which occurs in the optical fiber, and the wavelength dispersion, deterioration of the signal to be finally obtained is reduced.

Also, a technology described below was disclosed in JP-P1999-331074A as well. An optical fiber transmission line is split into a plurality of blocks for connection. So as to optimize dispersion compensation for each of this plurality of the blocks (to nullify a dispersive error), its blocks are caused to actively have a residual dispersion amount to a certain degree, and a block dispersion compensator is provided in a final region (region of the last block out of a plurality of the blocks) in which a receiver etc. is installed. A total residual dispersion value is nullified in the optical fiber transmission line by means of this block dispersion compensator.

However, the conventional wavelength division multiplexing optical fiber transmission line is configured so that the dispersion management transmission line to be arranged among a plurality of the optical repeaters has the positive dispersion fiber section and the negative dispersion fiber section alternatively arranged in plural. And, signal strength of the optical signal is high in an exit of the front-stage optical repeater (an input region to the fiber) because it has just been amplified, and on the other hand, the signal strength is set into a low state in an entrance of the next-stage optical repeater (an output region of the fiber) because the optical signal was subjected to passage loss of the fiber.

Also, in the event that the signal strength is high, the nonlinear effect in the fiber occurs greatly, whereby as a rule, in configuring the span by alternatively combining positive and negative dispersion, the positive dispersion fiber, which has a large core diameter and is less influenced by the nonlinear effect, is arranged in the front-half portion of the span (in the vicinity of the exit of the optical repeater in the front-stage portion). Also, the negative dispersion fiber, which has a small core diameter and is greatly influenced by the nonlinear effect, is arranged in the latter-half portion of the span (in the vicinity of the entrance of the optical repeater in the rear-stage portion).

And, so as to prevent transmission deterioration, when the span is configured with the alternate number of the fibers for dispersing positively and negatively increased, the negative dispersion fiber of which nonlinearity is large results in being arranged in the front-half portion of the span as "a negative dispersion fiber of which the nonlinearity is large". For this reason, an influence becomes large of the nonlinearity caused by the accumulated dispersion in the entirety of the above span, and conversely, the problem occurs that waveform deterioration is incurred.

Even though such a problem does not give rise to a special issue practically in the event that a transmission rate is 10 G b/s or something like it, or not more than this, it becomes a serious problem specially in the recent years that making the transmission rate much faster is under progress, as is the case with 40 G b/s of the next generation. That is, the foregoing conventional system, in which sufficient characteristics were not attained for the dispersive flatness, the low nonlinearity, the span accumulated dispersion, etc. in the transmission system having a high-speed transmission rate, for example, such as 40 G b/s, was not enough for a long-distance transmission.

Thus, an objective of the present invention is to provide a wavelength division multiplexing optical fiber transmission line that can reduce signal deterioration caused by an interaction between the accumulated dispersion and the nonlinear effect, and allows long-distance transmission to be made even at a high-speed transmission rate.

DISCLOSURE OF THE INVENTION

In order to solve said problems, a wavelength division multiplexing optical fiber transmission line in accordance with the present invention employs characteristic configurations as described next.

(1) A wavelength division multiplexing optical fiber transmission line having a dispersion management transmission line: having a positive dispersion fiber section, of which wavelength dispersion is positive, and a negative dispersion fiber section, of which wavelength dispersion is negative, alternatively arranged; and yet having 3 to 6 pairs of fiber sections arranged in series for configuration, each of said pairs consisting of said positive dispersion fiber section and said negative dispersion fiber section.

(2) The wavelength division multiplexing optical fiber transmission line of the above-mentioned (1), wherein a transmission rate of said dispersion management transmission line is 40 G b/s.

(3) The wavelength division multiplexing optical fiber transmission line of the above-mentioned (1), wherein said positive dispersion fiber section and said negative dispersion fiber section are configured of an almost identical member.

(4) The wavelength division multiplexing optical fiber transmission line of the above-mentioned (1), wherein said positive dispersion fiber section and said negative dispersion fiber section are configured so that the wavelength dispersion in one section is negated by the other section.

(5) A wavelength division multiplexing optical fiber transmission line having:

a plurality of dispersion management transmission lines, each of said dispersion management transmission lines having a positive dispersion fiber- section, of which wavelength dispersion is positive, and a negative dispersion fiber section, of which wavelength dispersion is negative, alternatively arranged, and yet having 3 to 6 pairs of fiber sections arranged in series, each of said pairs consisting of said positive dispersion fiber section and said negative dispersion fiber section; and optical repeaters arranged on an input side and an output side of said dispersion management transmission line.

(6) The wavelength division multiplexing optical fiber transmission line of the above-mentioned (5), wherein a transmission rate of said dispersion management transmission line is 40 G b/s.

(7) The wavelength division multiplexing optical fiber transmission line of the above-mentioned (5), wherein said positive dispersion fiber section and said negative dispersion fiber section are configured of an almost identical member.

(8) The wavelength division multiplexing optical fiber transmission line of the above-mentioned (5), wherein said positive dispersion fiber section and said negative dispersion fiber section are configured so that the wavelength dispersion in one section is negated by the other section.

(9) A wavelength division multiplexing optical fiber transmission line having:

a plurality of dispersion management transmission lines, each of said dispersion management transmission lines having a positive dispersion fiber section, of which wavelength dispersion is positive, and a negative dispersion fiber section, of which wavelength dispersion is negative, alternatively arranged, and yet having 3 to 6 pairs of fiber sections arranged in series, each of said pairs consisting of said positive dispersion fiber section and said negative dispersion fiber section;

a block transmission line having said plurality of said dispersion management transmission lines connected in series via an optical repeater; and a block dispersion compensator for guaranteeing dispersion of said block transmission line, said block dispersion compensator being arranged in a rear stage of said block transmission line.

(10) The wavelength division multiplexing optical fiber transmission line of the above-mentioned (9), wherein in the event of taking a span length of each of a plurality of the dispersion management transmission lines forming said block transmission line as L, and the arrangement/installation number of said dispersion management transmission line as N, a value of mean span wavelength dispersion of said block dispersion compensator is set at $\pm 250/(L \cdot N) \pm 0.5$.

(11) The wavelength division multiplexing optical fiber transmission line of the above-mentioned (9), wherein mean dispersion of said block transmission line is set at 0.01 to 0.1 (ps/nm/km) of positive dispersion.

(12) The wavelength division multiplexing optical fiber transmission line of the above-mentioned (9), wherein a transmission rate of said dispersion management transmission line is 40 G b/s.

(13) The wavelength division multiplexing optical fiber transmission line of the above-mentioned (9), wherein said positive dispersion fiber section and said negative dispersion fiber section are configured of an almost identical member.

(14) The wavelength division multiplexing optical fiber transmission line of the above-mentioned (9), wherein said positive dispersion fiber section and said negative dispersion fiber section are configured so that the wavelength dispersion in one section is negated by the other section.

(15) A wavelength division multiplexing optical fiber transmission line: having a dispersion management transmission line having a positive dispersion fiber section, of which wavelength dispersion is positive, and a negative dispersion fiber section, of which wavelength dispersion is negative, alternatively arranged; and yet having 4 pairs of fiber sections arranged in series for configuration, each of said pairs consisting of said positive dispersion fiber section and said negative dispersion fiber section.

(16) The wavelength division multiplexing optical fiber transmission line of the above-mentioned (15), wherein a transmission rate of said dispersion management transmission line is 40 G b/s.

(17) The wavelength division multiplexing optical fiber transmission line of the above-mentioned (15), wherein said positive dispersion fiber section and said negative dispersion fiber section are configured of an almost identical member.

(18) The wavelength division multiplexing optical fiber transmission line of the above-mentioned (15), wherein said positive dispersion fiber section and said negative dispersion fiber section are configured so that the wavelength dispersion in one section is negated by the other section.

BRIEF DESCRIPTION OF THE DRAWING

This and other objects, features and advantages of the present invention will become more apparent upon a reading of the following detailed description and drawings, in which.

DESCRIPTION OF THE EMBODIMENTS

Next, embodiments of the wavelength division multiplexing optical fiber transmission line in accordance with the present invention will be explained in detail by employing the accompanied drawings. At first a first embodiment will be explained by referring to FIG. 1 to FIG. 5.

Figure 1:
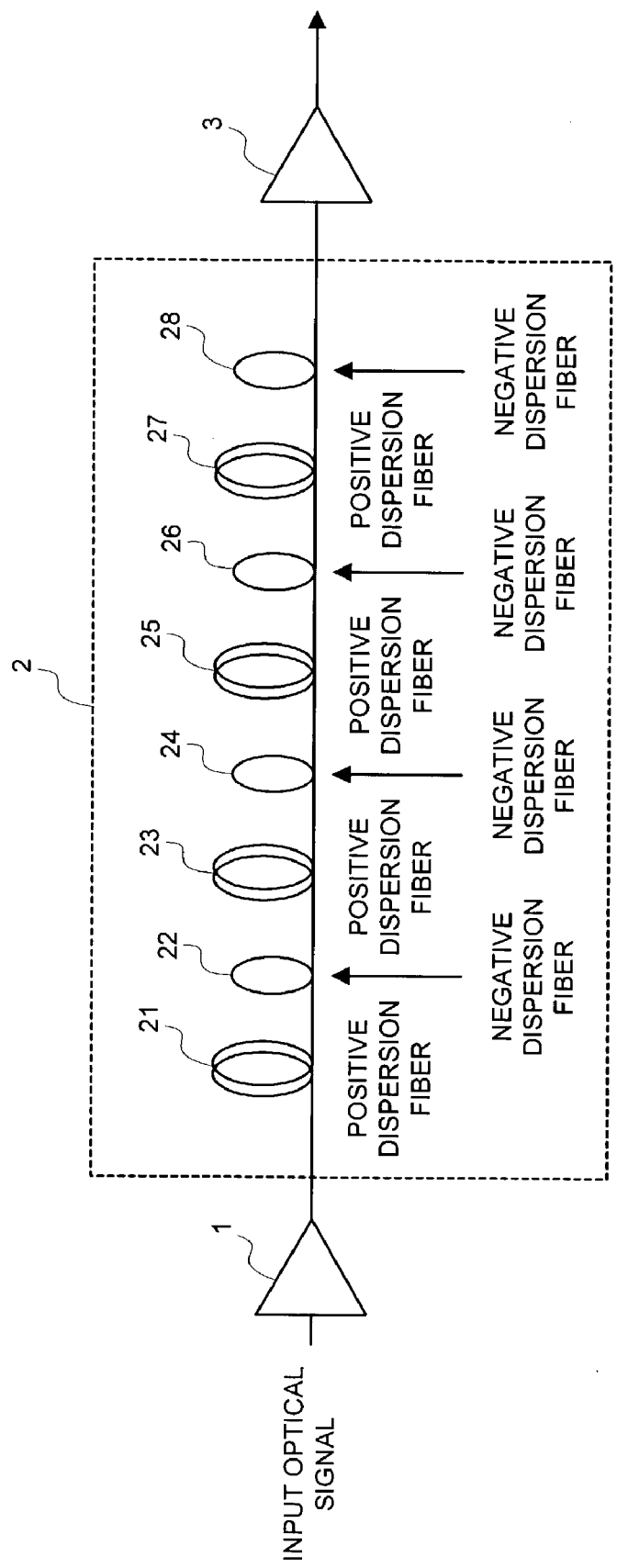
FIG. 1 is a circuit block diagram illustrating a basic configuration of a wavelength division multiplexing optical fiber transmission line in accordance with one embodiment of the present invention.

FIG. 1 is a view illustrating a configuration of this embodiment, an input region of a dispersion management transmission line 2 is connected to an output region of an optical repeater 1 into which an optical signal is input, and an output region of the former is connected to an input region of an optical repeater 3.

This dispersion management transmission line 2 has a positive dispersion fiber (PSCF; Pure Silica Core Fiber) section, of which the wavelength dispersion is positive, and a negative dispersion fiber (DCF; Dispersion Compensating Fiber) section, of which the wavelength dispersion is negative, arranged alternatively in plural (in this example, 8 sections). Specifically, 4 pairs, of which each is formed of the positive dispersion fiber section and the negative dispersion fiber section, are arranged in series to configure the dispersion management transmission line 2.

And, a pair having a second positive dispersion fiber 23 and a second negative dispersion fiber 24 connected is connected to a rear stage of a pair having a first positive dispersion fiber 21 and a first negative dispersion fiber 22 connected. Hereinafter, a pair of a third positive dispersion fiber 25 and a third negative dispersion fiber 26, and a pair of a fourth positive dispersion fiber 27 and a fourth negative dispersion fiber 28 are connected similarly.

Also, each of "the first negative dispersion fiber 22 to the fourth negative dispersion fiber 28" is for making the dispersion compensation over four stages for the dispersion and the dispersive slope to be accumulated in "the first positive dispersion fiber 21 to the fourth positive dispersion fiber 27".

The dispersion management transmission line 2 configured in such a manner makes dispersion compensation four times within its span. For this reason, the dispersion accumulation within the span can be suppressed to reduce optical-signal deterioration caused by an interaction between the dispersion and the nonlinear effect in the optical fiber, and to drastically improve transmission quality. The foregoing will be explained together with FIG. 2.

Figure 2:
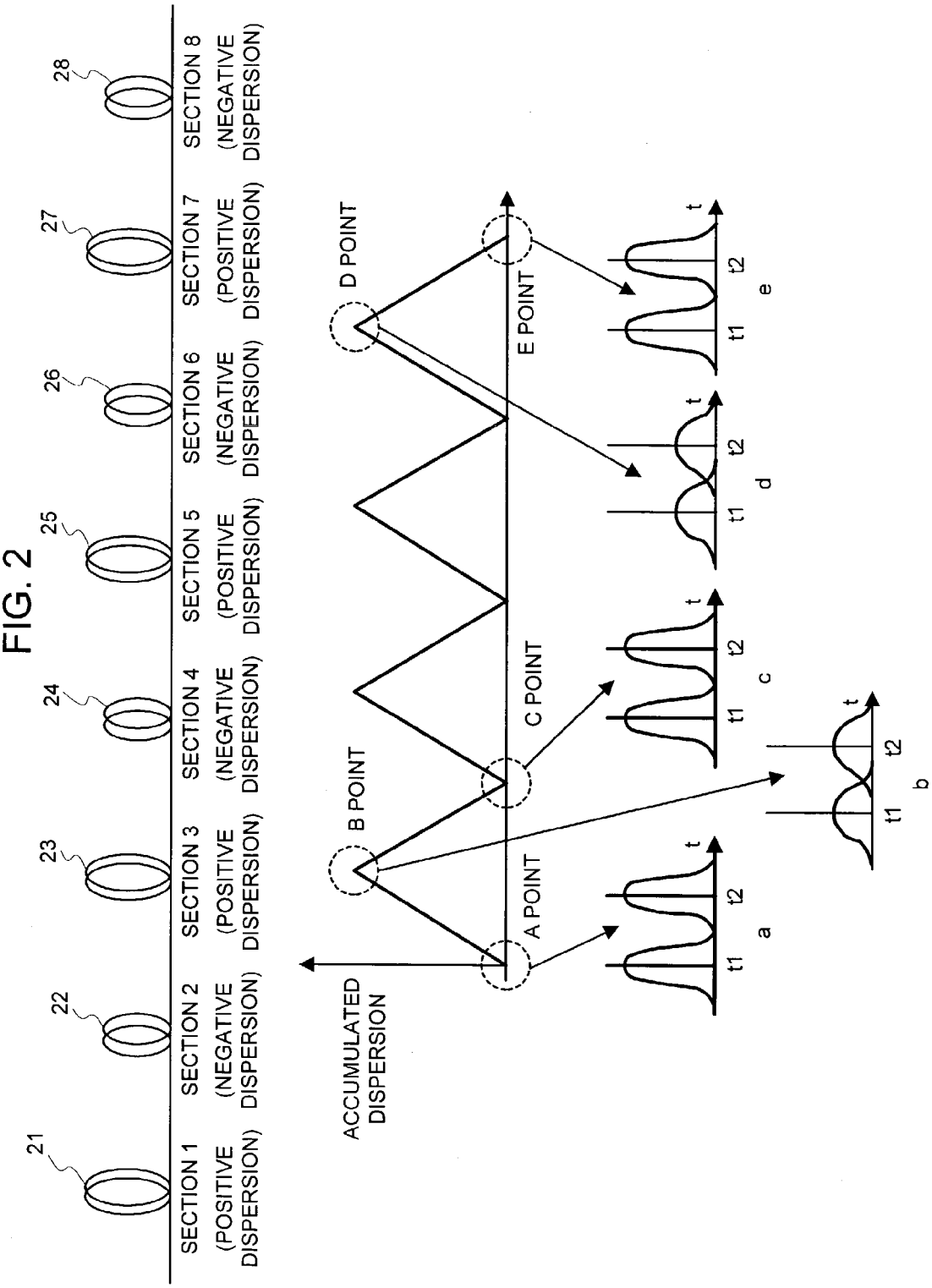
FIG. 2 is a view having a detailed configuration of the wavelength division multiplexing dispersion management transmission line shown in FIG. 1, an amount of accumulated dispersion in each section, and signal waveforms at typical several points represented together.

In the event that 8 fiver sections of the first positive dispersion fiber 21 to the fourth negative dispersion fiber 28 configuring the dispersion management transmission line 2 was arranged in one row, amounts of the accumulated dispersion in the longitudinal direction of respective sections are illustrated as a map. That is, five characteristics of a characteristic a to a characteristic e that show conceptual time waveforms at each of typical several points on this map, i.e. five points of A to E are illustrated in FIG. 2.

The positive dispersion fibers are employed for the first, third, fifth, and seventh sections out of eight sections configuring the dispersion management transmission line 2, and the negative dispersion fibers are arranged in the second, fourth, sixth, and eighth sections. By employing such a configuration, the compensation is made for the accumulated dispersion over four times within one repeating span. As a result, it becomes possible to suppress the maximum accumulated dispersion within the span to a small amount.

Figure 9:
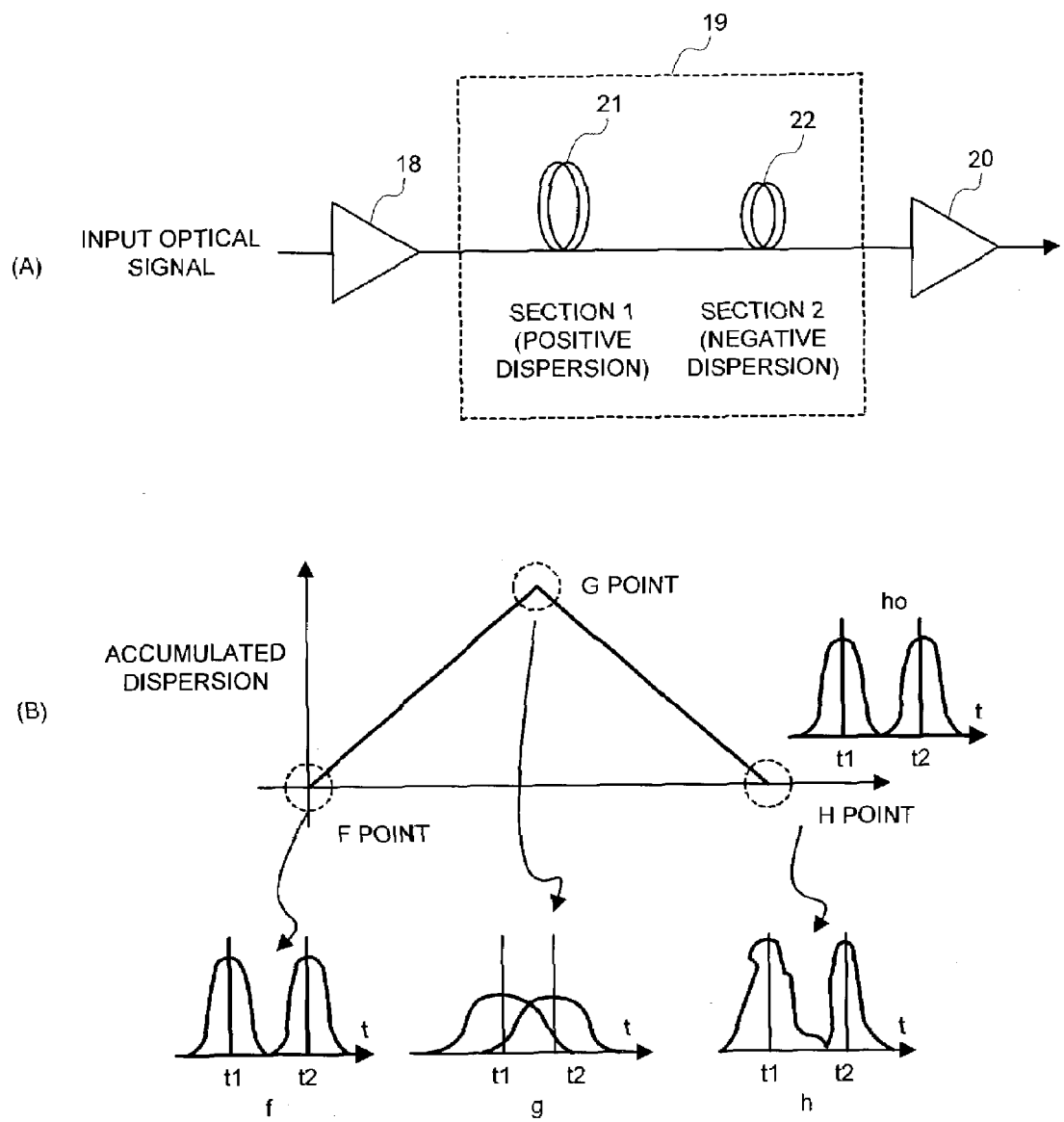
FIG. 9 is a view having a basic configuration of the conventional wavelength division multiplexing optical fiber transmission line, an amount of the accumulated dispersion in each section thereof, and signal waveforms at typical several points represented together.

In this case, the dispersion management transmission line 2 of this embodiment is compared with one-time turnaround type by the dispersion management transmission line (for example, the conventional optical fiber transmission line as shown in FIG. 9) having only one positive dispersion fiber and one negative dispersion fiber. And, the compensation is periodically made for the accumulated dispersion within the above dispersion management transmission line 2 step by step over four times so that an amount of the accumulated dispersion becomes one-fourth. Thereby, before the signal light to be transmitted spreads excessively due to the dispersion, the dispersion compensation is periodically made for the waveform thereof as well, whereby it becomes possible to return its shape to a shape of the original waveform.

By suppressing the accumulated dispersion by employing this dispersion management transmission line 2 of the four-time dispersion turnaround type, the signal deterioration caused by an interaction between a spread of the bit of the optical signal or an overlap between the bits, and the nonlinear effect in the optical fiber can be reduced to an allowable range.

A point shown in a graph of the accumulated dispersion corresponds to the output region of the optical repeater 1 (the input region of the first positive dispersion fiber 21), B point to a connection region between the first positive dispersion fiber 21 and the first negative dispersion fiber 22, C point to a connection region between the first negative dispersion fiber 22 and the second positive dispersion fiber 23, D point to a connection region between the fourth positive dispersion fiber 27 and the fourth negative dispersion fiber 28, and E point to the output region of the fourth negative dispersion fiber 28 (the input region of the optical repeater 2).

A characteristic a at point A is illustrated by putting the output signal waveforms at time t2 on the output signal waveforms at time t1, which correspond to the wavelength multiplexing channels (for example, two channels), in a time axis t. This characteristic a assumes a normal and beautiful wavelength because of a state that the signal, which was just amplified and compensated by the optical repeater 1, was input into the positive dispersion fiber 21.

On the other hand, a characteristic b at B point is in a state that the output of the optical repeater 1 is attenuated by passing through the positive dispersion fiber 21, yet is set into a state that a leading edge of the waveform thereof is gently spread by a component of the accumulated dispersion to be generated by passing through the positive dispersion fiber 21, and comes to be in a state that the waveforms are heavily overlapped between two bits, thus causing a large nonlinear effect (self-phase modulation) to occur.

Such a signal at B point, which was compensated for the accumulated dispersion and the dispersive slope by passing through the next-stage negative dispersion fiber 22, becomes a characteristic c at C point. The waveform at this C point is almost identical to the original waveform having the ideal state (characteristic a), and in a state that a slight dispersion residual value was added hereto.

Hereinafter, the step-by-step dispersion compensation is similarly made over plural times in the second negative dispersion fiber 24 to the fourth negative dispersion fiber 28. And the waveform of the characteristic d at point D, which "was set into in a state that a leading edge of the waveform was gently spread, and was in a state that the waveforms were heavily overlapped between two bits", is compensated for the accumulated dispersion and the dispersive slope by passing through the next-stage fourth negative dispersion fiber 28. Thereby, the signal of the output region of the fourth negative dispersion fiber 28, which is a final signal of the dispersion management transmission line 2, is reproduced into a characteristic e of which the waveform is almost identical to the original waveform having the ideal state (characteristic a).

Figure 3:
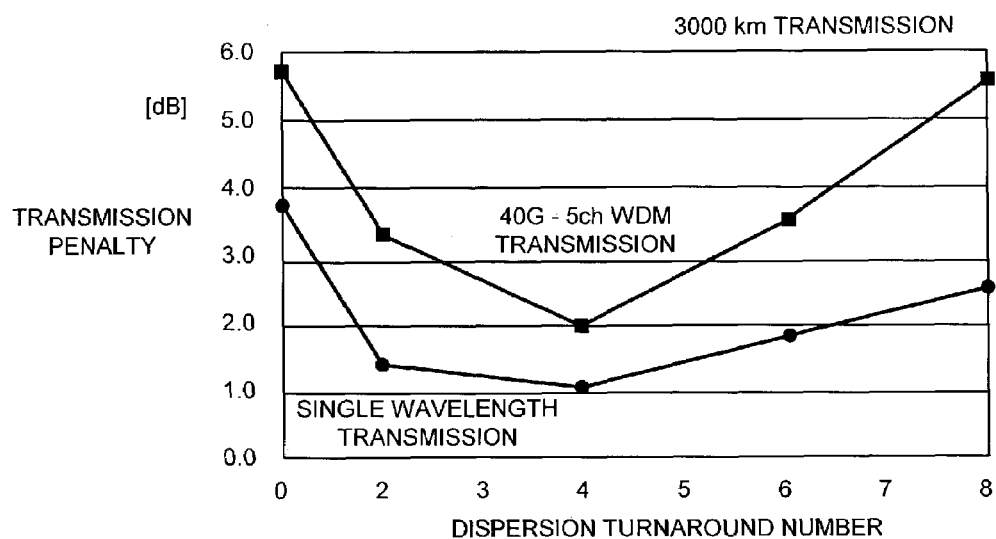
FIG. 3 is a characteristic view illustrating a value of a transmission penalty at the time that the dispersion turnaround number of the dispersion management transmission line shown in FIG. 1 was varied.

A result of a numerical simulation performed for confirming effectiveness of the dispersion management transmission line of the present invention is illustrated in FIG. 3.

FIG. 3 is a view to be illustrated by causing the result obtained by operating a numerical calculation of the transmission penalty (dB) after transmission at each of the case of "the single wavelength transmission" and the case of "the five-channel wavelength division multiplexing transmission" when a transmission distance is taken as 3,000 km, and a transmission rate as 40 G b/s in the dispersion management transmission line 2 to correspond to respective cases in which the turnaround number of the positive dispersion fiber section and the negative dispersion fiber section within one dispersion management transmission line was varied from one time to eight times.

As apparent from FIG. 3, it is understood that the transmission penalty is minimum when the dispersion turnaround number is four in either case of "the single wavelength transmission" or "the five-channel wavelength division multiplexing transmission".

Figure 4:
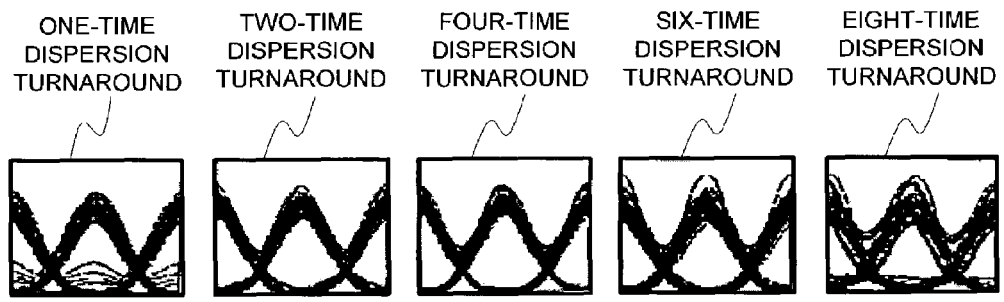
FIG. 4 is waveform views to be illustrated by causing eye patterns of a transmission characteristic in the event of single wavelength transmission to correspond to respective variations in the dispersion turnaround number.

Also, in FIG. 4 are illustrated eye patterns at respective cases in which the dispersion turnaround number is one, two, four, six, and eight in the event of "the single wavelength transmission". Furthermore, in FIG. 5 are illustrated eye patterns at respective cases in which the dispersion turnaround number is one, two, four, six, and eight in the event of "the five-channel wavelength division multiplexing transmission".

Figure 5:
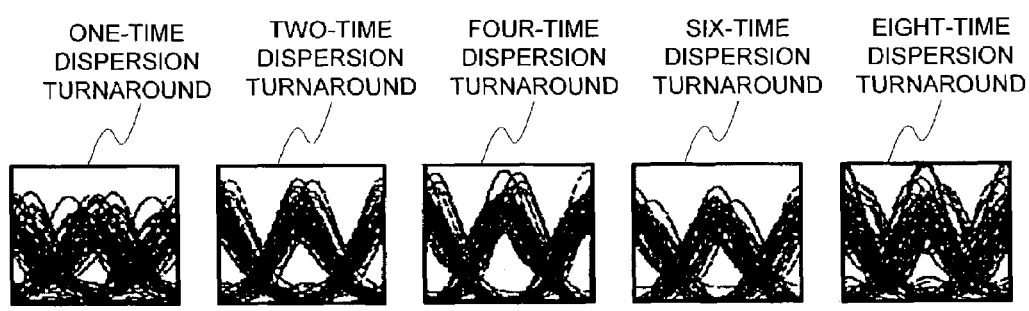
FIG. 5 is waveform views to be illustrated by causing the eye patterns of the transmission characteristic in the event of five-channel wavelength division multiplexing transmission to correspond to respective variations in the dispersion turnaround number.

As apparent from FIG. 4 and FIG. 5, in either case of "the single wavelength transmission" or "the five-channel wavelength division multiplexing transmission", an amount of phase deviation in the eye pattern at the time of 4-time dispersion turnaround is minimum, an amount of the phase deviation becomes much more either even though the dispersion turnaround number becomes much less such as two and one, or it becomes much more such as six and eight, and anyway the minimum phase deviation is attained when the dispersion turnaround number is four.

Herein, the primary factor that causes the transmission penalty is the waveform deterioration caused by an interaction between the accumulated dispersion within the span and the nonlinear effect. As a rule, the nonlinearity of the negative dispersion fiber such as the first negative dispersion fiber 22 is larger than that of the positive dispersion fiber such as the first positive dispersion fiber 21. For this reason, so as to obtain excellent transmission quality, the positive dispersion fiber of which the nonlinearity is small is arranged in the high-power region adjacent to the output region of the optical repeater 1 to realize low linearization.

Also, increase in the turnaround number of the dispersion enables the accumulated dispersion to be reduced; however to that extent the negative dispersion fibers result in being arranged numerously in the high-power region. As a result, the nonlinear effect increases. For this reason, when the excessive dispersion turnaround is carried out, notwithstanding the dispersion compensation, all the more the transmission deterioration is incurred. In accordance with this simulation, the optimum number of the dispersion turnaround to be obtained from both of the accumulated dispersion and the nonlinear effect is four.

Additionally, as to this dispersion management transmission line 2, the dispersion compensation is added to the rear stage of the above dispersion management transmission line 2. And, by making the configuration so that a value of the mean span wavelength dispersion in the added dispersion compensator meets $\pm 250/L \pm 0.5$ when a span length of the dispersion management transmission line 2 is taken as L, the optimum dispersion compensation can be made. Also, the above dispersion compensator may be included in a circuit to be connected to the rear stage of the dispersion management transmission line 2, for example, the optical repeater, an optical receiver, etc. for configuration.

Figure 6:
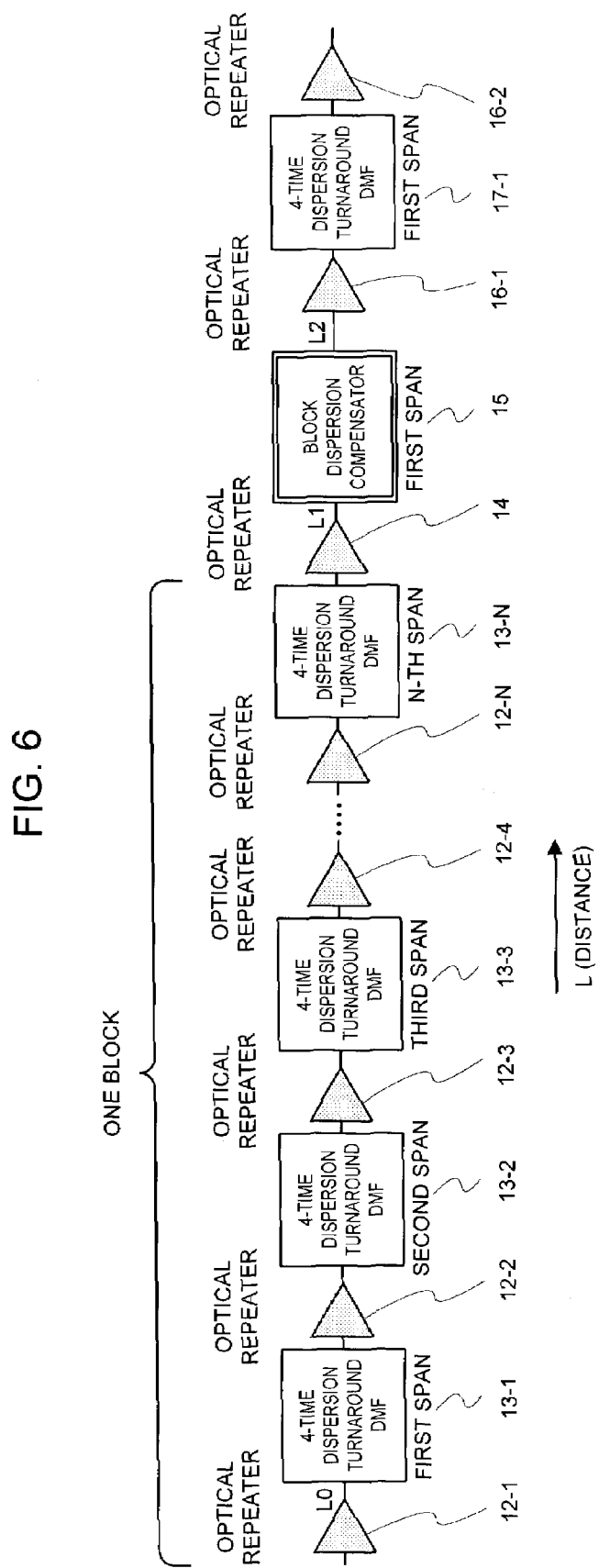
FIG. 6 is a circuit block diagram illustrating a basic configuration of the wavelength division multiplexing optical fiber transmission line in accordance with another embodiment of the present invention.
Figure 7:
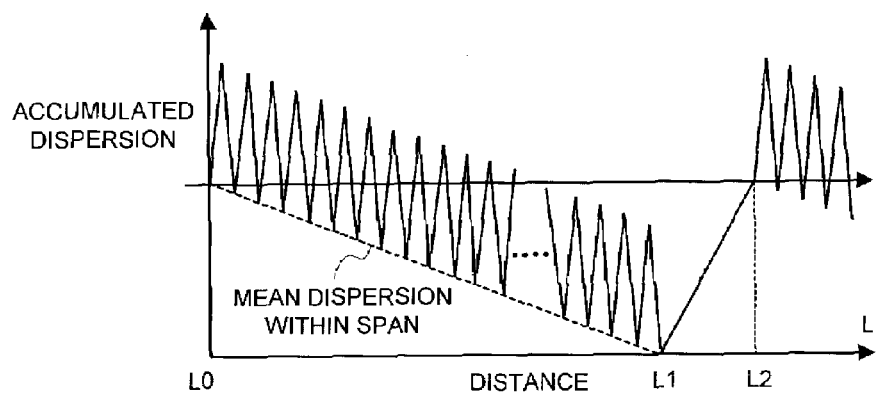
FIG. 7 is a view illustrating an amount of the accumulated dispersion in each section of the optical fiber transmission line shown in FIG. 6 in a time-series manner.
Figure 8:
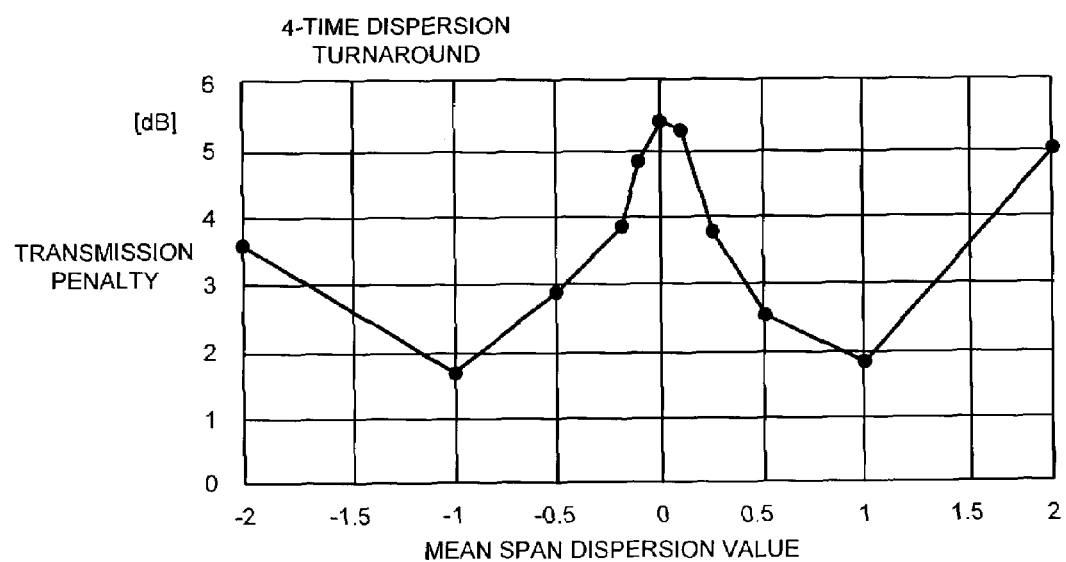
FIG. 8 is a characteristic view illustrating a relation between a mean dispersion value of a block dispersion compensator shown in FIG. 6, and the transmission penalty.

Next, the wavelength division multiplexing optical fiber transmission line in accordance with a second embodiment of the present invention will be explained by employing FIG. 6 to FIG. 8.

A basic configuration of this embodiment is made to connect the dispersion management transmission lines of the four-time dispersion turnaround type, which exist in plural, in series for forming one block transmission line, and to provide the block dispersion compensator in the rear stage of this block transmission line.

Also, the configuration is made so that when a span length of each of a plurality of the dispersion management transmission lines forming the above block transmission line is taken as L, and the arrangement/installation number of said dispersion management transmission lines as N, a value of the mean span wavelength dispersion in said block dispersion compensator meets ±250/(L·N)±0.5 [ps/nm/km].

Also, the configuration is made so that the optical repeater is interposed between mutually neighboring regions out of a plurality of the dispersion management transmission lines.

"The block transmission line" forming one block has N optical repeaters 12-1 to 12-N for amplifying and outputting the input signal light. N "dispersion management transmission lines, in which 4 pairs each of which consists of the positive dispersion fiber and the negative dispersion fiber are included for configuration", are arranged among respective optical repeaters as a first span 13-1 to a N-th span 13-N.

Also, a block dispersion compensator 15 is connected to the output region of the N-th span 13-N, which is the N-th, via an optical repeater 14, and "the block transmission line" similar to the foregoing is connected to the rear stage of the latter.

Each of the first span 13-1 to the N-th span 13-N has a certain mean span dispersion value separately. And the compensation is made by the block dispersion compensator 15 for the dispersion component to be accumulated within one block in sequentially passing through the first span 13-1 to the N-th span 13-N.

As to the accumulated dispersion (see FIG. 7) that occurs to each section in the above block transmission line, in the event that N was taken as 5, its value is increased in each of the first span 13-1 to the N-th (fifth) span 13-N by passing through the positive dispersion fibers. Thereafter, the first-time compensation is made for the accumulated dispersion value by passing through the negative dispersion fiber, which is decreased, then is increased by passing through the next-stage positive dispersion fiber, and the second-time compensation is made for the accumulated dispersion by passing through the next-stage negative dispersion fiber, which is decreased.

Hereinafter, after the increase/decrease was similarly repeated 20 times in total by 4-time turnarounds and 5-time passages, the dispersion compensation is made by the block dispersion compensator 15.

This compensation was established so that when the span number of the dispersion management transmission line of the 4-time dispersion turnaround type was taken as N, and a span length of each of the first span 13-1 to the N-th span 13-N as L, a value (ps/nm/km) of the mean span wavelength dispersion in the dispersion compensator 15 met ±250/(L·N) ±0.5.

Accordingly, in the event that the transmission distance is 3,000 km, N is 5, each of the first span 13-1 to the N-th span 13-N is configured of the 4-time dispersion turnaround, and "the five-channel wavelength division multiplexing transmission" is carried out, a value of the mean span wavelength dispersion, which the block dispersion compensator 15 should have, is 1±0.5 (ps/nm/km) or −1±0.5 (ps/nm/km). Also, from a comparison result of the transmission penalty characteristic (see FIG. 8) to the mean span dispersion value by the numerical simulation, in the event of the configuration in which the block dispersion compensators 15 are inserted N spans by N spans, establishment is made so that the mean dispersion in one block (block transmission line) becomes 0.01 to 0.1 (ps/nm/km) of the positive dispersion.

As a result, a component (see FIG. 7), which remains after passing through the block transmission line to be configured of five spans, is offset and is almost completely negated by a dispersion compensation amount established in the block dispersion compensator 15. Also, an ideal waveform is reproduced equivalent to the signal to be input into the input region of the positive dispersion fiber (first span 13-1) that is positioned in the first stage of the block transmission line, and the transmission deterioration caused by a nonlinear interaction between the channels at the time of the wavelength division multiplexing can be reduced to improve transmission quality.

Additionally, a function of the dispersion compensation by the block dispersion compensator 15 to be connected to the rear stage of the block transmission line may be included for configuration in the optical repeater 14 that is positioned at the first of the next system, and may be included for configuration in the optical receiver that is positioned at the first of the next system.

By configuring each of the above-mentioned positive dispersion fiber section and negative dispersion fiber section of an almost identical member, reduction of the cost and stabilization of the characteristics can be realized.

The optical fiber transmission line in accordance with the foregoing embodiment is particularly effective in the wavelength division multiplexing transmission of which the transmission rate is 40 G b/s or something like it; however needless to say, it is also effective in the transmission system having the high-speed transmission rate more than this.

Above, the configuration and the operation of the preferred embodiments of the wavelength division multiplexing optical fiber transmission line in accordance with the present invention was described in detail. Such embodiments, however, are only example of the present invention, and limit the present invention under no circumstances. Those skilled in the art will easily understand that it is possible to encompass various changes and modifications hereto responding to specific applications without departing from the intention and the scope of the present invention.

As apparent from the explanation above, in the wavelength division multiplexing optical fiber transmission line in accordance with the present invention, the dispersion management transmission line is configured of a plurality of pairs (for example, 4 pairs) of which each has "the positive dispersion fiber and the negative dispersion fiber". For this reason, the dispersion compensation is made step by step by the next-stage negative dispersion fiber over plural times (4 times) for the dispersion and the dispersive slope accumulated by the front-stage positive dispersion fiber, whereby there is no possibility that the dispersion accumulation by the positive dispersion fiber becomes large. Also, the signal deterioration caused by an interaction between the accumulated dispersion and the nonlinear effect can be reduced.

Accordingly, when the wavelength division multiplexing optical fiber transmission line in accordance with the present invention is employed in the transmission system having a high-speed transmission rate, it is capable of reducing an amount of the waveform deterioration as much as possible, by, as to the optical fiber transmission line that has the dispersion management transmission line having the positive dispersion fiber section, of which the wavelength dispersion is positive, and the negative dispersion fiber section, of which the wavelength dispersion is negative, alternatively arranged in plural, optimizing the alternate number of its fiber section, and optimizing the mean dispersion value within the above dispersion management transmission line.

The entire disclosure of Japanese Patent Application No. 2002-088759 filed on Mar. 27, 2002 including specification, claims, drawing and summary are incorporated herein by reference in its entirety.

What is claimed is:

1. A wavelength division multiplexing optical fiber transmission line comprising a dispersion management transmission line,
   said dispersion management transmission line consisting of 3 to 6 pairs of fiber sections arranged in series without intervening elements for configuration, each of said pairs including a positive dispersion fiber section and a negative dispersion fiber section, and
   wherein wavelength dispersion of said positive dispersion fiber section is positive;
   wherein dispersion of said negative dispersion fiber section wavelength dispersion is negative, alternatively arranged, and
   wherein signal deterioration caused by interaction between the accumulated dispersion is reduced, wherein a mean dispersion value within the dispersion management transmission line is $\pm 250/(L \cdot N) \pm 0.5$, where L is the length of the dispersion management transmission line, and N is a span number of dispersion management transmission channels that are consecutively inserted between block dispersion compensators.

2. The wavelength division multiplexing optical fiber transmission line according to claim 1, wherein a transmission rate of said dispersion management transmission line is 40 Gb/s.

3. The wavelength division multiplexing optical fiber transmission line according to claim 1, wherein said positive dispersion fiber section and said negative dispersion fiber section are configured of an almost identical member.

4. The wavelength division multiplexing optical fiber transmission line according to claim 1, wherein said positive dispersion fiber section and said negative dispersion fiber section are configured so that the wavelength dispersion in one section is negated by the other section.

5. The wavelength division multiplexing optical fiber transmission line according to claim 1, further comprising optical repeaters arranged on an input side and an output side of said dispersion management transmission line.

6. The wavelength division multiplexing optical fiber transmission line according to claim 1, wherein said dispersion management transmission line comprises 4 pairs of fiber sections arranged in series for configuration, each of said pairs including said positive dispersion fiber section and said negative dispersion fiber section.

7. A method for transmitting wavelength division multiplexed signal,
   said method consisting of 3 to 6 steps in series
   wherein each of said steps comprises:
      positively dispersing; and
      negatively dispersing, wherein signal deterioration caused by interaction between the accumulated dispersion is reduced, such that a mean dispersion value within a dispersion management transmission line is $\pm 250/(L \cdot N) \pm 0.5$, where L is the length of the dispersion management transmission line, and N is a span number of dispersion management transmission channels that are consecutively inserted between block dispersion compensators.

8. The method according to claim 7, further comprising transmitting said wavelength division multiplexed signal at 40 Gb/s.

9. The method according to claim 7, wherein said method comprising 4 steps in series.

* * * * *